(12) United States Patent
Yoon et al.

(10) Patent No.: US 9,959,842 B2
(45) Date of Patent: May 1, 2018

(54) ON-SCREEN DISPLAY AT THIN CLIENT

(71) Applicant: AMERICAN MEGATRENDS, INC., Norcross, GA (US)

(72) Inventors: David Yoon, Chamblee, GA (US); Jayachandran Gnanasekaran, Duluth, GA (US); Yugender P. Subramanian, Norcross, GA (US); Varadachari Sudan Ayanam, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days. days.

(21) Appl. No.: 15/202,989

(22) Filed: Jul. 6, 2016

(65) Prior Publication Data

US 2018/0012569 A1    Jan. 11, 2018

(51) Int. Cl.
*G09G 5/36* (2006.01)
*G09G 5/377* (2006.01)
*G06F 3/14* (2006.01)

(52) U.S. Cl.
CPC .............. *G09G 5/377* (2013.01); *G06F 3/14* (2013.01); *G06F 3/1415* (2013.01); *G06F 3/1454* (2013.01); *G06F 3/1462* (2013.01); *G09G 5/363* (2013.01); *G09G 2340/12* (2013.01); *G09G 2360/18* (2013.01); *G09G 2370/20* (2013.01)

(58) Field of Classification Search
CPC ........ G06F 3/14; G06F 3/1415; G06F 3/1454; G06F 3/1462; G09G 2350/00; G09G 2370/022; G09G 5/026; G09G 5/14
USPC .......................... 345/531; 709/203; 715/740
See application file for complete search history.

(56) References Cited

U.S. PATENT DOCUMENTS

| | | | | |
|---|---|---|---|---|
| 2010/0268813 | A1* | 10/2010 | Pahlavan | G06F 9/4445 709/224 |
| 2011/0047476 | A1* | 2/2011 | Hochmuth | G06F 3/1431 715/744 |
| 2012/0127185 | A1* | 5/2012 | Chowdhry | G09G 5/393 345/531 |
| 2012/0218292 | A1* | 8/2012 | Nyczyk | G06F 3/1462 345/629 |
| 2012/0260157 | A1* | 10/2012 | Zhu | G06F 17/30902 715/234 |
| 2013/0166691 | A1* | 6/2013 | Robinson | H04N 21/235 709/219 |
| 2014/0198112 | A1* | 7/2014 | Miyamoto | G06T 1/20 345/522 |
| 2014/0362097 | A1* | 12/2014 | Chowdhry | G06T 1/60 345/547 |

(Continued)

*Primary Examiner* — Jin-Cheng Wang
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a device. The device receives content to be displayed on a screen of the device. The device generates a picture based on the content. The device sends the picture to an on-screen display driver bypassing a thin client operating system of the device. The device replaces at least a portion of pixel data in a frame buffer of the device with the picture. The pixel data is presented on the screen. The device transfers the pixel data in the frame buffer to a display driver of the device. The display driver generates display signals based on the pixel data.

19 Claims, 8 Drawing Sheets

(56) References Cited

U.S. PATENT DOCUMENTS

2015/0109310 A1* 4/2015 Ayanam ............... G06T 1/20
                                                      345/505
2015/0227384 A1* 8/2015 Zamir ................. G06F 8/65
                                                      718/1

* cited by examiner

ON-SCREEN DISPLAY AT THIN CLIENT

BACKGROUND

Field

The present disclosure relates generally to networked computer systems, and more particularly, to techniques of providing on-screen display at a thin client.

Background

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

As a user's data and applications (known as the user's session) are predominantly located on the server, there is a need for effective thin client device session management, in order to enable the user to reliably and securely access their session. Further, a thin client, e.g., when operating in a windowless mode, may not have a graphic sub-system. As such, there is a need to provide a mechanism such that certain information and events can be communicated via the thin client.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device. The device receives content to be displayed on a screen of the device. The device generates a picture based on the content. The device sends the picture to an on-screen display driver bypassing a thin client operating system of the device. The device replaces at least a portion of pixel data in a frame buffer of the device with the picture. The pixel data is presented on the screen. The device transfers the pixel data in the frame buffer to a display driver of the device. The display driver generates display signals based on the pixel data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
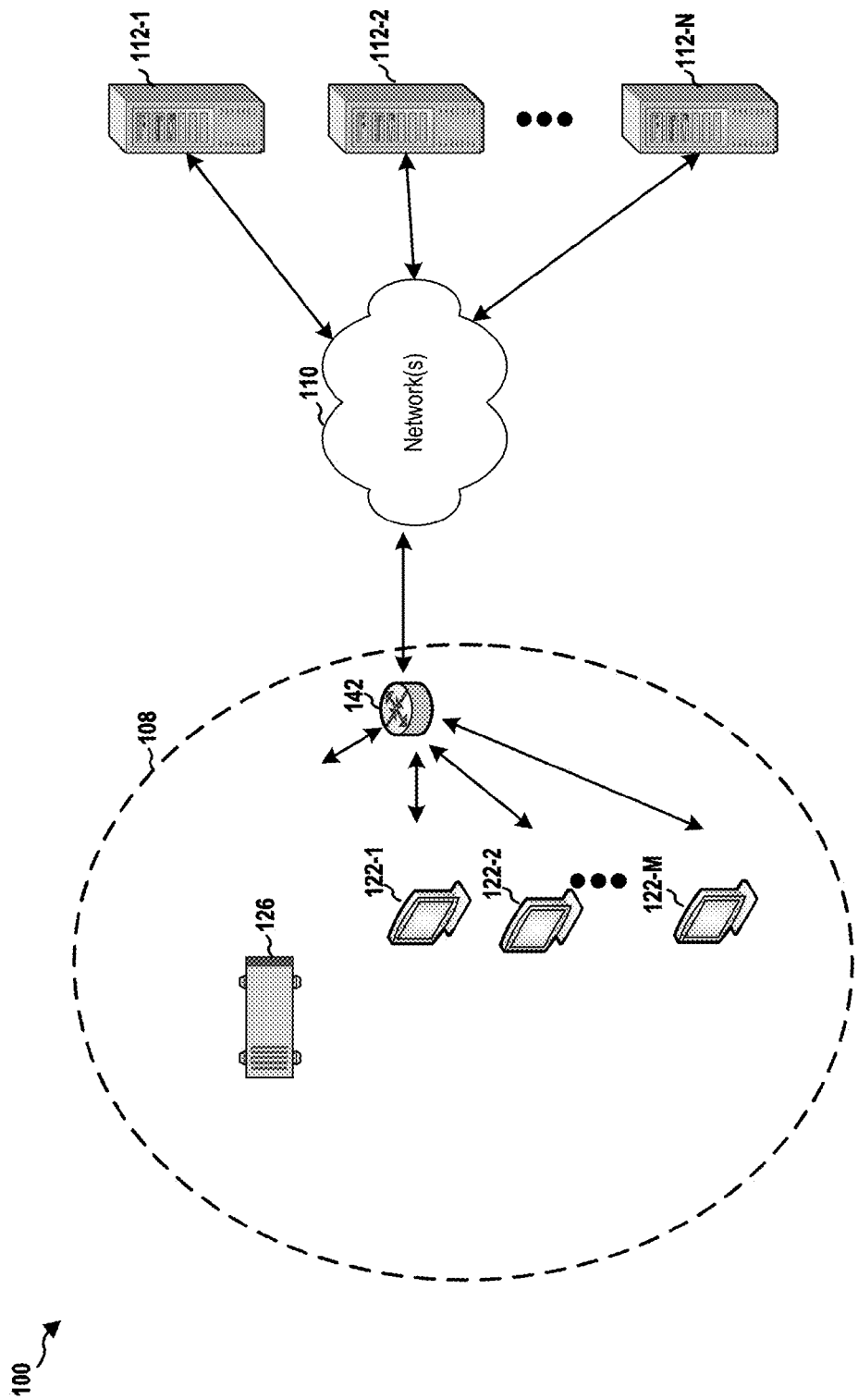
FIG. 1 is a diagram illustrating networked thin clients and remote machines.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Many embedded environments prefer small operating systems (e.g., LINUX or similar) for easy porting. Majority of embedded platforms deploy a small memory. Accordingly, the embedded platforms may not include a graphic sub-system due to the large memory footprint and size of the graphic sub-system. In particular, in zero/thin client scenarios a remote desktop may be operated in windowless mode. Further, when a user is interacting with an application in full screen mode, it is difficult and inefficient to obtain any visual information outside the realm of the currently active application. This is particularly true in the case of windowless systems. As such, there is a need to provide a mechanism such that certain information and events can be communicated via the thin client.

FIG. 1 is a diagram 100 illustrating networked thin clients and remote machines. One or more of M thin clients 122-1, 122-2, . . . , 112-M each may be utilized to establish a respective session with one or more of N remote machines 112-1, 112-2, . . . 112-N, M and N each being a respective integer greater than 0. In certain configurations, the thin clients 122-1, 122-2, . . . , 112-M may be in communication with the remote machines 112-1, 112-2, . . . , 112-N through a network 110 (e.g., Internet).

Further, a thin client manager 126 may be utilized to manage the thin clients 122-1, 122-2, . . . , 112-M and/or the remote machines 112-1, 112-2, . . . , 112-N. The thin client manager 126 and the thin clients 122-1, 122-2, . . . , 112-M may be in the same network such as a LAN 108, which may be a wireless local area network (WLAN) or a wired LAN. In certain configurations, those devices may be in different networks or in different types of networks.

Figure 2:
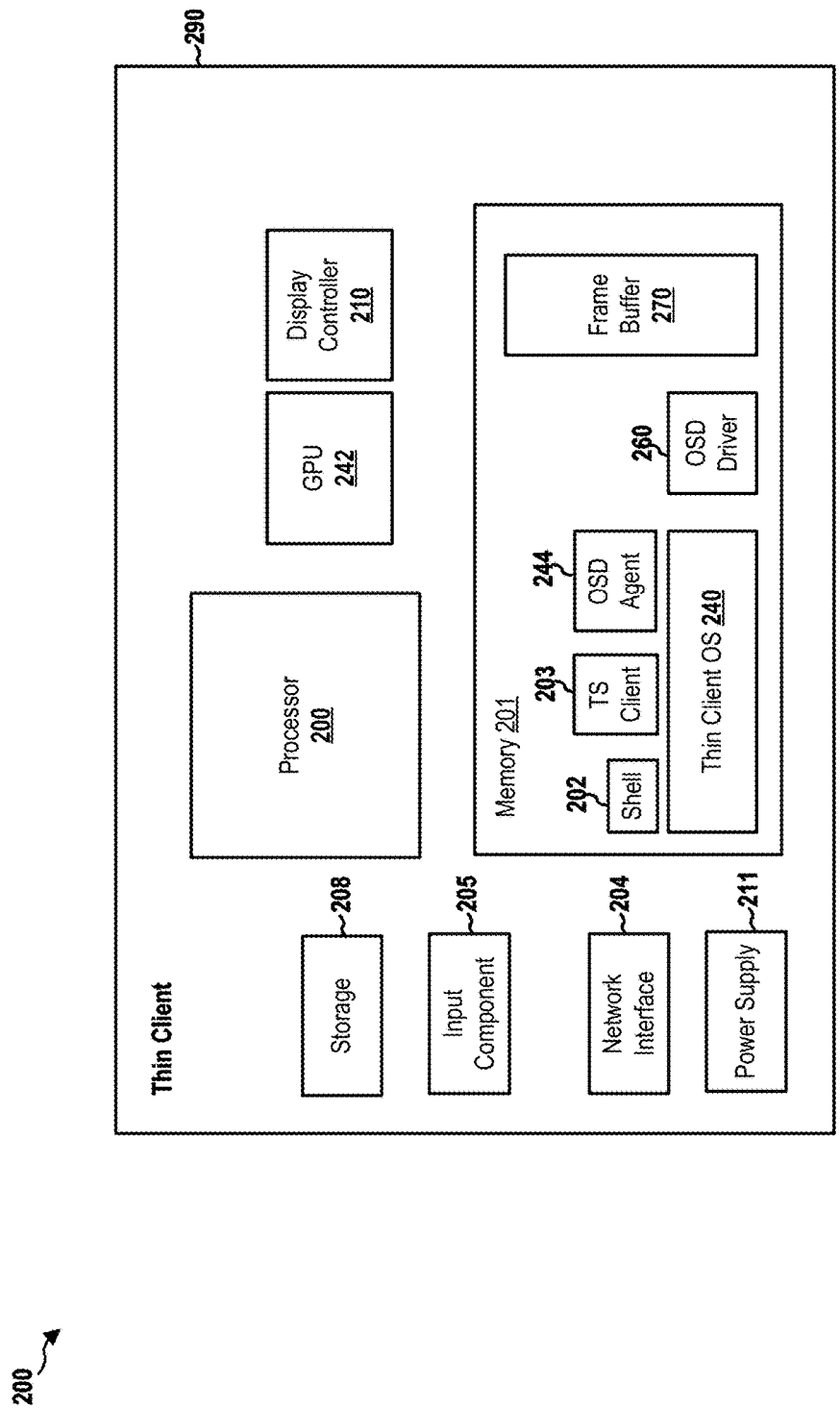
FIG. 2 is a diagram illustrating an exemplary thin client.

FIG. 2 is a diagram illustrating an exemplary thin client. A thin client 290, which may be any one of the thin clients 122-1, 122-2, . . . , 112-M, includes one or more processors 200, which can be microprocessors, controllers or any other suitable type of processors for processing computing executable instructions to control the operation of the thin client. A storage component 208 may be used by the thin client 290 to store firmware of the thin client 290, which includes computer executable instructions. The storage component 208 may be a disk storage device of any type such as a magnetic or optical storage device, a hard disk drive, or a CD, DVD or other disc drive. Flash memory, EPROM or EEPROM can also be used.

The processor 200 may load components of the firmware into a memory 201 for execution. The memory 201 is of any suitable type such as random access memory (RAM). The memory 201 thus may store components of the firmware such as a software shell 202, a terminal server (TS) client 203 application, an on-screen display agent 244, a thin client operating system 240, and an on-screen display driver 260. The thin client operating system 240 is a system that manages the thin client hardware and software resources and that provides common services for programs of the thin client. The thin client operating system 240 directs operations of the thin client 290. The thin client operating system 240 may control and schedule the execution of other programs, and managing storage, input/output, and communication resources. The thin client operating system 240 may not be a traditional full-blown operating system such as MICROSOFT WINDOWS or APPLE OS X. The thin client operating system 240 may be a lightweight system that performs limited functions and tasks. In certain configurations, the thin client operating system 240 may be LINUX based. The memory 201 may also have a separate area that includes a frame buffer 270. In certain configurations, a graphics processing unit (GPU) 242 of the thin client 290 may execute code and process data stored in the memory 201 and, accordingly, may generate pixel data and writes the pixel data in the frame buffer 270.

Image output of the thin client 290 can be provided by a display controller 210. The display controller 210 may read the pixel data from the frame buffer 270 and generates display signals according to the pixel data. The display controller 210 may send display signals to a display peripheral. For example, the display signals may be transmitted to a monitor (e.g., a screen) of the thin client 290. The monitor displays a screen image based on the display signals. In certain configurations, the display controller 210 may send display image packets to a WLAN display via a network interface 204.

The network interface 204 enables the thin client 290 to communicate over a network (in particular a wireless network) with the remote machines 112-1, 112-2, . . . , 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., a keyboard and a mouse) and receive input from the input peripherals. The thin client 290 further comprises a power supply 211 such as a battery or a wired power source. Further, the thin client 290 may also include an on-screen display agent 244 that can be used to communicate with the thin client manager 126.

Figure 3:
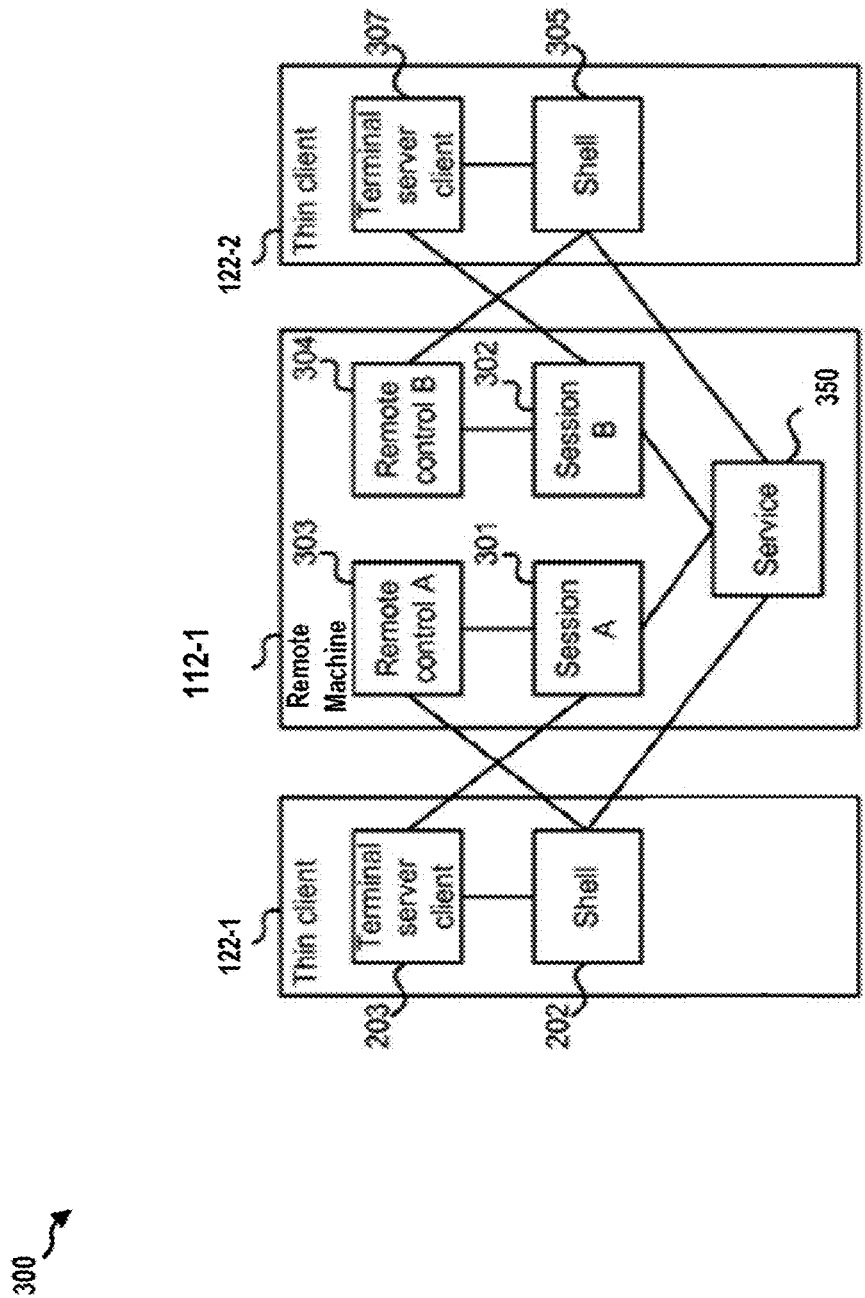
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remoting.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
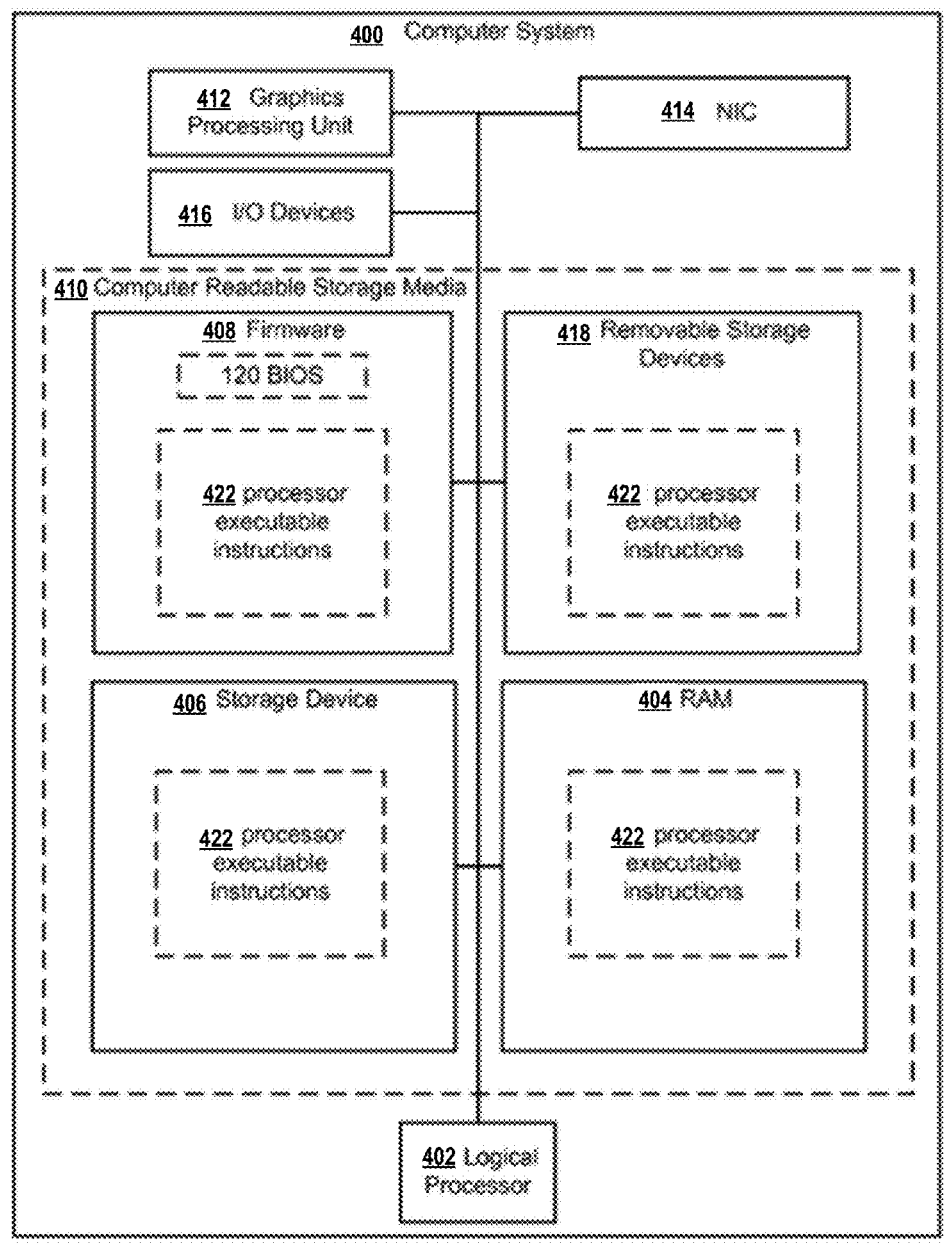
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couples various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers, such as a remote computer. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
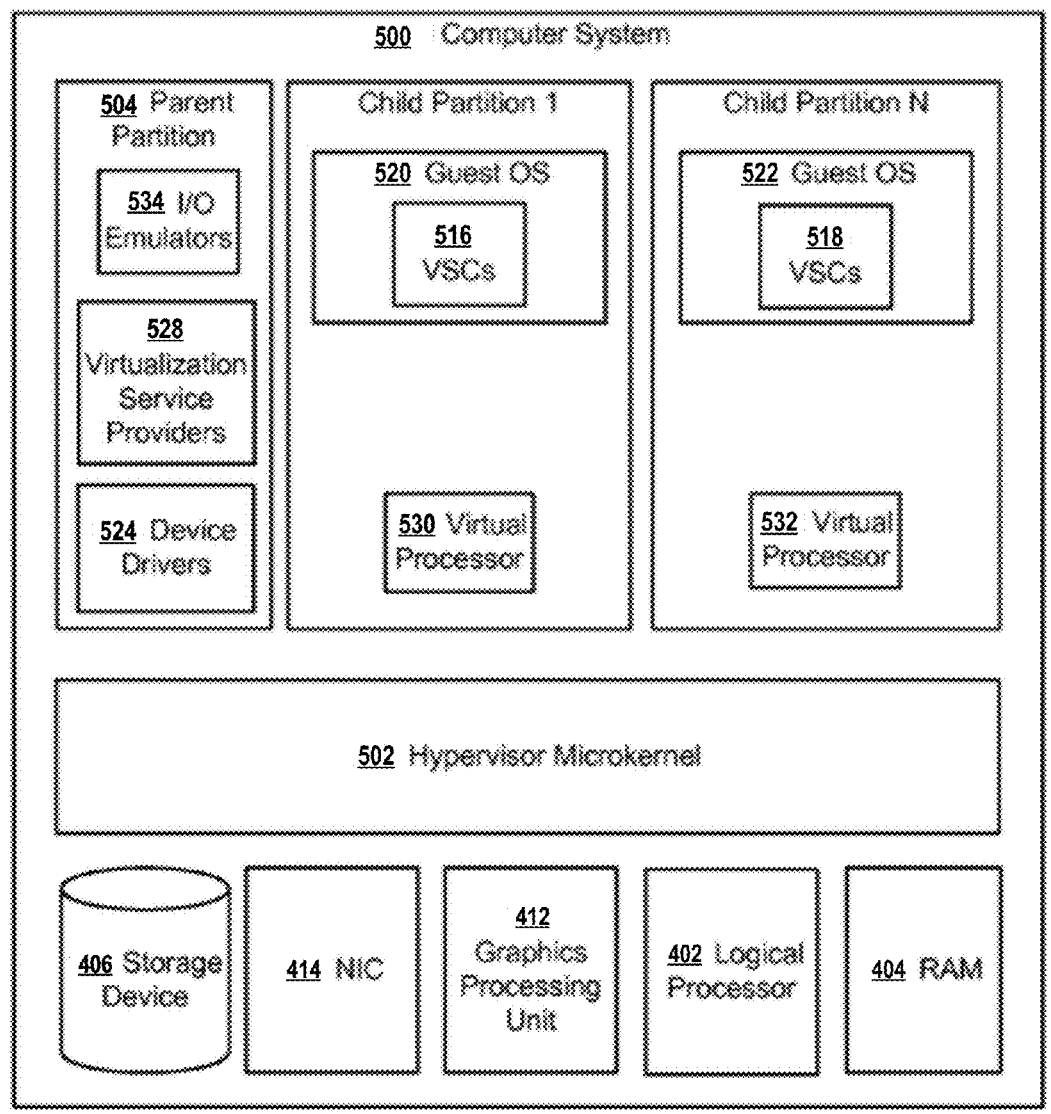
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as back-end drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
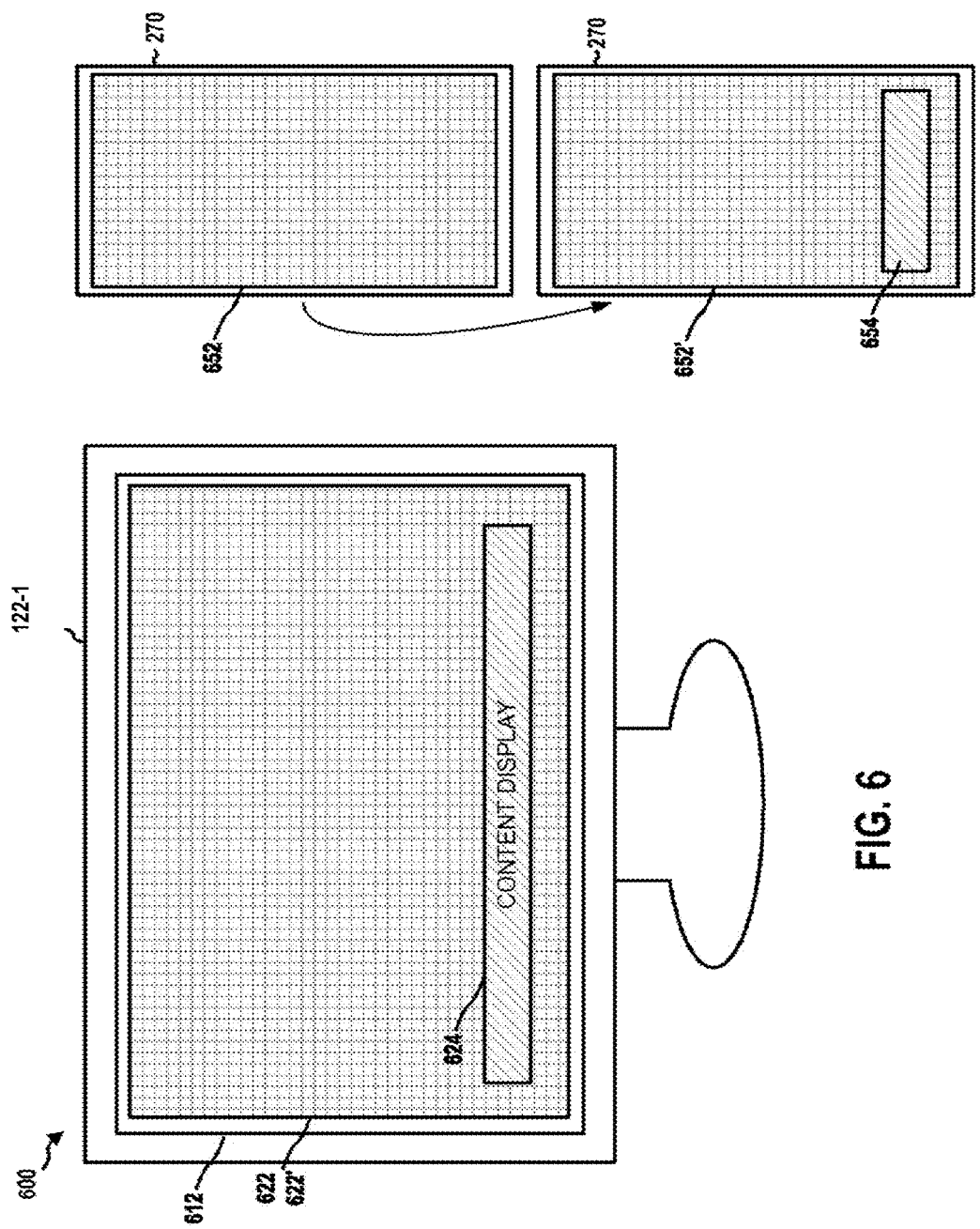
FIG. 6 is another diagram illustrating an exemplary thin client.

As shown in FIG. 1, a thin client of the thin clients 122-1, 122-2, . . . , 112-M may establish a respective session with one or more of the remote machines 112-1, 112-2, . . . , 112-N. As an example, the thin client 122-1 may establish a session with the remote machine 112-1. FIG. 6 is a diagram 600 illustrating the thin client 122-1. The thin client 122-1 has a screen panel 612. In this example, the TS client 203 of the thin client 122-1 may receive display data, representing a screen image 622, from the remote machine 112-1. As described supra, the GPU 242 of the thin client 122-1 may be utilized to process the display data and write accordingly generated screen image pixel data 652 to the frame buffer 270. The display controller 210 reads the screen image pixel data 652 from the frame buffer 270 and then renders the screen image 622 on the screen panel 612.

In certain configurations, the on-screen display agent 244 of the thin client 122-1 is in communication with the thin client manager 126, and may receive content from the thin client manager 126. The content may be an administrative message, a news ticker, an advertisement, and local time information, or any other type of instructions. The on-screen display agent 244 generates an on-screen display image 624 based on the content. In one scenario, the administrative message may include a text message that the firmware of the thin client is being upgraded by the thin client manager 126. In another scenario, the thin client 122-1 may be in a different time zone from the remote machines 112-1, 112-2, . . . , 112-N. The thin client manager 126 may send the local time information to the on-screen display agent 244 of the thin client 122-1.

The on-screen display agent 244 uses the on-screen display driver 260 to write accordingly generated on-screen display pixel data 654 at the predetermined location in the frame buffer 270. As described supra, the on-screen display driver 260 may be a component independent of, and not a part of, the thin client operating system 240. The on-screen display driver 260 may utilize the GPU 242 to generate the on-screen display pixel data 654 and write the on-screen display pixel data 654 to the frame buffer 270. In other words, a part of the existing screen image pixel data 652 in the frame buffer 270 is replaced by the on-screen display pixel data 654, and the screen image pixel data 652 becomes modified screen image pixel data 652'. The modified screen image pixel data 652' includes the on-screen display pixel data 654. Subsequently, the display controller 210 reads the modified screen image pixel data 652' from the frame buffer 270 and renders a modified screen image 622' on the screen panel 612, the modified screen image 622' including the on-screen display image 624. In other words, portions of the screen image 622 is replaced by the on-screen display image 624. The location of the on-screen display image 624 at the screen panel 612 may be dictated by the location of the on-screen display pixel data 654 in the frame buffer 270.

In certain configurations, the thin client 122-1 may also have established a session with the remote machine 112-2, in addition to the remote machine 112-1. The TS client 203 may receive display data from the remote machine 112-2. The display data represent a screen image of the remote machine 112-2. The TS client 203 may determine whether to display the screen image of the remote machine 112-1 (i.e., the screen image 622) or the screen image of the remote machine 112-2 on the screen panel 612, for example, based on user input or other instructions. When the TS client 203 selects to display the screen image of the remote machine 112-2 on the screen panel 612, the GPU 242 is utilized to process the display data received from the remote machine 112-2 and write accordingly generated pixel data to the frame buffer 270. The display controller 210 reads the pixel data from the frame buffer 270 and then renders the screen image of the remote machine 112-2 on the screen panel 612.

Further, the on-screen display agent 244 may obtain information from the TS client 203 regarding the currently displayed screen image of the screen panel 612. The on-screen display agent 244 may generate an on-screen display image 624 that indicates the information. For example, the on-screen display image 624 may display the name of the remote machine (e.g., the remote machine 112-1 or the remote machine 112-2) whose screen image is currently displayed on the screen panel 612.

In certain configurations, the on-screen display agent 244 of the thin client 122-1 may receive hardware events from the thin client operating system 240. For example, when a USB device, a monitor, or another device is plugged to or unplugged from the thin client 122-1, the on-screen display agent 244 may receive a corresponding event from the thin client operating system 240. Further, the on-screen display agent 244 may receive information regarding usage of one or more particular hardware components such as the processor 200 and the memory 201. Similarly, the on-screen display agent 244 may receive other types of events or information (e.g., those regarding software) from the thin client operating system 240. In certain configurations, the thin client 122-1 may have been authorized to establish a session with the remote machine 112-1 for a session time period. The on-screen display agent 244 receives content regarding the session time period from the thin client operating system 240. For example, the content may include information regarding the length of the remaining time period in the session time period. The on-screen display agent 244 may generate an on-screen display image 624 indicating the events or information. The on-screen display image 624 may be rendered on the screen panel 612 as described supra.

Figure 7:
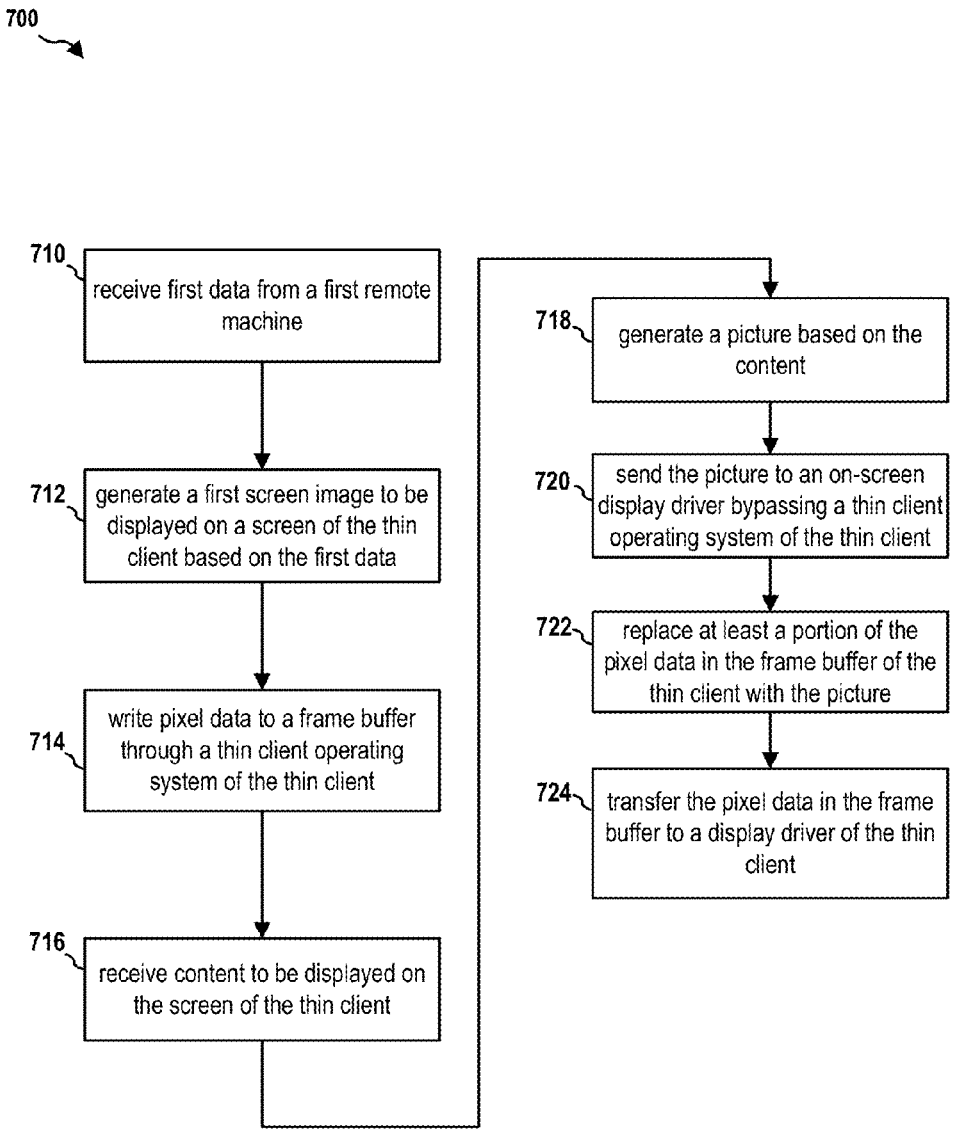
FIG. 7 is a flow chart of a method (process) for providing on-screen display.

FIG. 7 is a flow chart 700 of a method (process) for providing on-screen display. The method may be performed by a device (e.g., the thin clients 122-1, 122-2, . . . , 112-M and the apparatus 290/290'). At operation 710, the device receives first data from a first remote machine. At operation 712, the device generates a first screen image to be displayed on a screen of the device based on the first data. At operation 714, the device writes pixel data to the frame buffer through a thin client operating system of the device. The pixel data represents the first screen image.

At operation 716, the device receives content to be displayed on the screen of the device. At operation 718, the device generates a picture based on the content. At operation 720, the device sends the picture to an on-screen display driver bypassing a thin client operating system of the device. At operation 722, the device replaces at least a portion of the pixel data in a frame buffer of the device with the picture. The pixel data is presented on the screen. At operation 724, the device transfers the pixel data in the frame buffer to a display driver of the device. The display driver generates display signals based on the pixel data.

In certain configurations, the device has been authorized to establish a session with the first remote machine for a session time period. The content is received from the thin client operating system and regarding the session time period. In certain configurations, the device receives second data from a second remote machine. The device generates a second screen image to be displayed on the screen of the device based on the second data. The pixel data in the frame buffer represents the first screen image when the first screen image is selected to be displayed on the screen. The pixel data in the frame buffer represents the second screen image when the second screen image is selected to be displayed on the screen. The content is received from the thin client operating system and regarding the selection of the first screen image and the second screen image.

In certain configurations, the content is received, from a management device, at an on-screen display agent hosted on the thin client operating system. The content includes at least one of an administrative message, a news ticker, an advertisement, and local time information. In certain configurations, the content is received from the thin client operating system and regarding one or more hardware events of the device. The one or more hardware events include at least one of a universal serial bus (USB) device connection event, a monitor connection event, a processor usage event, and a memory usage event.

Figure 8:
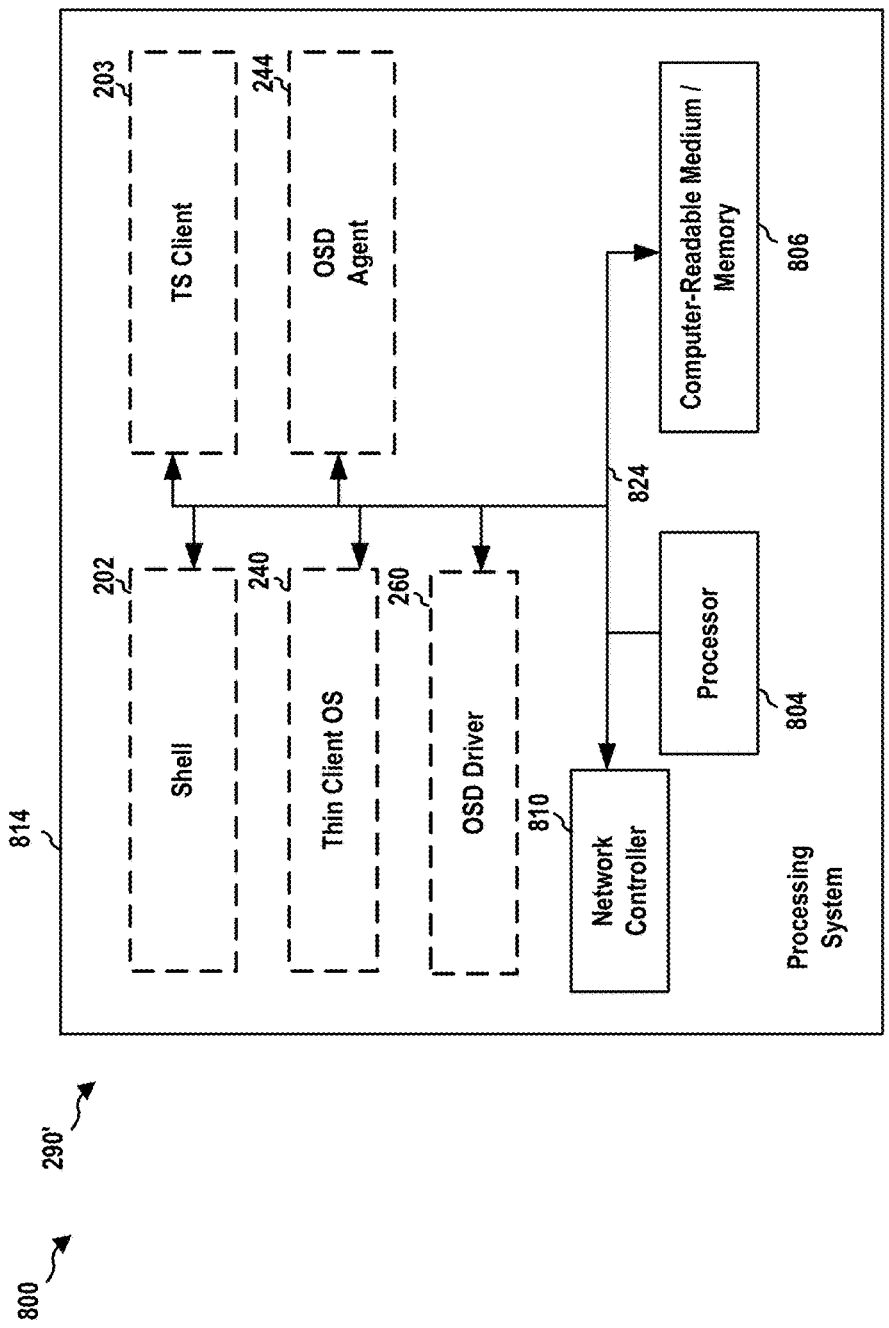
FIG. 8 is a diagram illustrating an example of a hardware implementation for an apparatus employing a processing system.

FIG. 8 is a diagram 800 illustrating an example of a hardware implementation for an apparatus 290' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the shell 202, the TS client 203, the thin client operating system 240, the on-screen display agent 244, the on-screen display driver 260, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a network controller 810. The network controller 810 provides a means for communicating with various other apparatus over a network. The network controller 810 receives a signal from the network, extracts information from the received signal, and provides the extracted information to the processing system 814, specifically a communication module/component. In addition, the network controller 810 receives information from the processing system 814, specifically the communication module/component, and based on the received information, generates a signal to be sent to the network. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the shell 202, the TS client 203, the thin client operating system 240, the on-screen display agent 244, the on-screen display driver 260. The components may be software components running in the processor 804, resident/stored in the computer readable medium/memory 806, one or more hardware components coupled to the processor 804, or some combination thereof.

The apparatus 290/290' may be configured to include means for performing each of the operations described supra referring to FIG. 7. The aforementioned means may be one or more of the aforementioned components of the apparatus 290 and/or the processing system 814 of the apparatus 290' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client, comprising:
   receiving content to be displayed on a screen of the thin client;
   generating a picture based on the content;
   sending the picture to an on-screen display driver bypassing a thin client operating system of the thin client, wherein the on-screen display driver generates pixel data of the picture; and
   replacing at least a portion of pixel data of an existing screen image in a frame buffer of the thin client with the pixel data of the picture, the picture and part of the existing screen image being presented on the screen, wherein
   the location of the picture on the screen is determined by the location of the pixel data of the picture in the frame buffer, and
   the content to be displayed comprises (1) information regarding a remaining time period length in a session time period for the content to be displayed on the screen and (2) at least one of an administrative message, a news ticker, an advertisement and local time information.

2. The method of claim 1, further comprising transferring the pixel data in the frame buffer to the on-screen display driver of the thin client, wherein the on-screen display driver generates display signals based on the pixel data.

3. The method of claim 1, further comprising:
   receiving first data from a first remote machine;
   generating a first screen image to be displayed on the screen of the thin client based on the first data; and
   writing the pixel data to the frame buffer through the thin client operating system of the thin client, wherein the pixel data represents the first screen image.

4. The method of claim 3, wherein the thin client has been authorized to establish a session with the first remote machine for the session time period, wherein the content is received from the thin client operating system and regarding the session time period.

5. The method of claim 3, further comprising:
   receiving second data from a second remote machine; and
   generating a second screen image to be displayed on the screen of the thin client based on the second data, wherein the pixel data represents the first screen image when the first screen image is selected to be displayed on the screen, wherein the pixel data represents the second screen image when the second screen image is selected to be displayed on the screen, wherein the content is received from the thin client operating system and regarding the selection of the first screen image and the second screen image.

6. The method of claim 1, wherein the content is received, from a management device, at an on-screen display agent hosted on the thin client operating system.

7. The method of claim 1, wherein the content is received from the thin client operating system and regarding one or more hardware events of the thin client.

8. The method of claim 7, wherein the one or more hardware events include at least one of a universal serial bus (USB) device connection event, a monitor connection event, a processor usage event, and a memory usage event.

9. An apparatus for managing thin clients, comprising:
a memory; and
at least one processor coupled to the memory and configured to:
receive content to be displayed on a screen of the thin client;
generate a picture based on the content;
send the picture to an on-screen display driver bypassing a thin client operating system of the thin client, wherein the on-screen display driver generates pixel data of the picture; and
replace at least a portion of pixel data of an existing screen image in a frame buffer of the thin client with the pixel data of the picture, the picture and part of the existing screen image being presented on the screen, wherein
the location of the picture on the screen is determined by the location of the pixel data of the picture in the frame buffer, and
the content to be displayed comprises (1) information regarding a remaining time period length in a session time period for the content to be displayed on the screen and (2) at least one of an administrative message, a news ticker, an advertisement and local time information.

10. The apparatus of claim 9, wherein the at least one processor is further configured to transfer the pixel data in the frame buffer to the on-screen display driver of the thin client, wherein the on-screen display driver generates display signals based on the pixel data.

11. The apparatus of claim 9, wherein the at least one processor is further configured to:
receive first data from a first remote machine;
generate a first screen image to be displayed on the screen of the thin client based on the first data; and
write the pixel data to the frame buffer through the thin client operating system of the thin client, wherein the pixel data represents the first screen image.

12. The apparatus of claim 11, wherein the thin client has been authorized to establish a session with the first remote machine for the session time period, wherein the content is received from the thin client operating system and regarding the session time period.

13. The apparatus of claim 11, wherein the at least one processor is further configured to:
receive second data from a second remote machine; and
generate a second screen image to be displayed on the screen of the thin client based on the second data, wherein the pixel data represents the first screen image when the first screen image is selected to be displayed on the screen, wherein the pixel data represents the second screen image when the second screen image is selected to be displayed on the screen, wherein the content is received from the thin client operating system and regarding the selection of the first screen image and the second screen image.

14. The apparatus of claim 9, wherein the content is received, from a management device, at an on-screen display agent hosted on the thin client operating system.

15. A non-transitory computer-readable medium storing computer executable code for managing thin clients, comprising code to:
receive content to be displayed on a screen of the thin client;
generate a picture based on the content;
send the picture to an on-screen display driver bypassing a thin client operating system of the thin client, wherein the on-screen display driver generates pixel data of the picture; and
replace at least a portion of pixel data of an existing screen image in a frame buffer of the thin client with the pixel data of the picture, the picture and part of the existing screen image being presented on the screen, wherein
the location of the picture on the screen is determined by the location of the pixel data of the picture in the frame buffer, and
the content to be displayed comprises (1) information regarding a remaining time period length in a session time period for the content to be displayed on the screen and (2) at least one of an administrative message, a news ticker, an advertisement and local time information.

16. The non-transitory computer-readable medium of claim 15, wherein the code is further configured to transfer the pixel data in the frame buffer to the on-screen display driver of the thin client, wherein the on-screen display driver generates display signals based on the pixel data.

17. The non-transitory computer-readable medium of claim 15, wherein the code is further configured to:
receive first data from a first remote machine;
generate a first screen image to be displayed on the screen of the thin client based on the first data; and
write the pixel data to the frame buffer through the thin client operating system of the thin client, wherein the pixel data represents the first screen image.

18. The non-transitory computer-readable medium of claim 17, wherein the thin client has been authorized to establish a session with the first remote machine for the session time period, wherein the content is received from the thin client operating system and regarding the session time period.

19. The non-transitory computer-readable medium of claim 17, wherein the code is further configured to:
receive second data from a second remote machine; and
generate a second screen image to be displayed on the screen of the thin client based on the second data, wherein the pixel data represents the first screen image when the first screen image is selected to be displayed on the screen, wherein the pixel data represents the second screen image when the second screen image is selected to be displayed on the screen, wherein the content is received from the thin client operating system and regarding the selection of the first screen image and the second screen image.

* * * * *